(12) United States Patent
Yamauchi

(10) Patent No.: US 6,819,917 B2
(45) Date of Patent: Nov. 16, 2004

(54) REMOTE OUTPUT SYSTEM

(75) Inventor: Kazuyuki Yamauchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 605 days.

(21) Appl. No.: 09/775,647

(22) Filed: Feb. 5, 2001

(65) Prior Publication Data
US 2001/0018330 A1 Aug. 30, 2001

(30) Foreign Application Priority Data
Feb. 7, 2000 (JP) ........................................ 2000-029646

(51) Int. Cl.[7] .............................................. H04M 1/66
(52) U.S. Cl. ................... 455/411; 455/41.2; 455/412.1; 709/225; 709/229
(58) Field of Search ................................ 455/410, 411, 455/412.1, 41.2, 41.3, 418–419, 420; 340/5.1, 5.2, 5.91; 380/247, 270; 709/219, 225, 229

(56) References Cited

U.S. PATENT DOCUMENTS
6,601,102 B2 * 7/2003 Eldridge et al. ............ 709/229

FOREIGN PATENT DOCUMENTS
JP  10-191453   7/1998
JP  10-222527   8/1998

* cited by examiner

Primary Examiner—Lee Nguyen
(74) Attorney, Agent, or Firm—Oblon, Spivak, McClelland, Maier & Neustadt, P.C.

(57) ABSTRACT

The remote output system comprises a mobile telephone with which a user retrieves information through a network, a computer that provides the information through the mobile telephone, and an output unit that outputs the information transmitted from the mobile telephone or the computer.

31 Claims, 6 Drawing Sheets

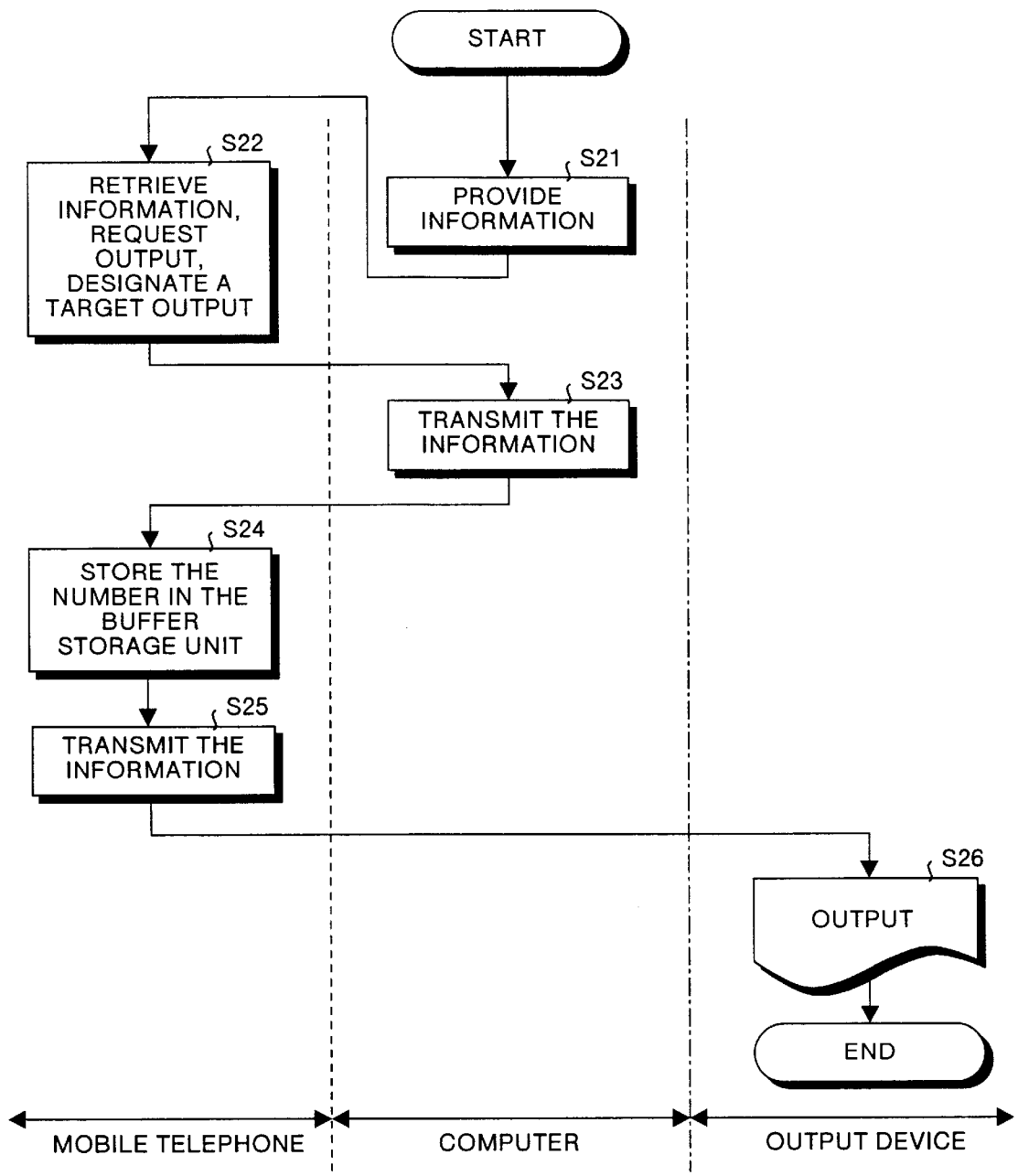

REMOTE OUTPUT SYSTEM

FIELD OF THE INVENTION

The present invention relates to a remote output system in which various types of information provided by a computer are retrieved from a mobile telephone and confidentiality of the information related to an output request issued from the mobile telephone is ensured.

BACKGROUND OF THE INVENTION

An information output system using PDA (Personal Digital Assistants) as a portable information device having a communicating function is becoming rapidly common. In such a system, document information created by a personal computer or a workstation, information searched and downloaded through the Internet, or information in an electronic mail is quite often output by an output device (printer) connected to a dedicated network.

A technology of transmitting document data created by a portable information device such as PDA to a printing unit installed at a store designated by a user and printing out the data is disclosed, for example, in "Data transfer output system and information processing unit" in JP, HEI 10-191453A. Further, an information output system is disclosed in JP, HEI 10-222527A. In this information output system, a user of a portable information device retrieves desired information such as map information, weather information, or information for train timetables from a service center, and the retrieved data can be output at a place designated by the user. The place may be a convenience store, a gas station, or a service area on a highway. Particularly, in this system, an output device that outputs retrieved data is connected to a dedicated network and information is retrieved using a dedicated terminal such as PDA.

In the conventional system, however, when information is to be retrieved and an output request for the information is to be issued, the retrieval of the information is executed using a dedicated terminal such as PDA. Therefore, a commonly used mobile telephone cannot be used as a general-purpose terminal for retrieval.

In the case of JP, HEI 10-191453A, information to be printed out is supposed to be handed over at a store where printing service is provided. While, in the case of JP, HEI 10-222527A, the information retrieved through the portable information device is output from an output device installed at a place designated by a user. Accordingly, a third party may be involved during operation from retrieval till output of information. Therefore, output information may be leaked, thus confidentiality of the information may not be ensured when the information is output.

SUMMARY OF THE INVENTION

It is an object of this invention to enable retrieval and output of information without having to use a terminal specific to retrieval of the information by operating a mobile telephone so as to perform retrieval of information and issue its output request.

It is another object of this invention to store information retrieved by a mobile telephone in an output device or the mobile telephone, and ensure the confidentiality of the information by authenticating a user in the side of output device.

The system according to one aspect of this invention retrieves information provided by a computer and issues an output request for the information through a mobile telephone, and outputs an image of the information from an output device on a network. Accordingly, the need for preparing a dedicated terminal for retrieval like in the conventional system is eliminated.

In the system according to another aspect of this invention, when information provided by a computer is to be output, an output request for desired information is issued to the computer through a mobile telephone. The computer adds an authentication number to the information and transmits the number to a target output device, stores the authentication number and the information in a storage unit, and verifies an authentication number transmitted from the mobile telephone. When there is a match between the authentication number and the stored authentication number, the information is output from the output device. Accordingly, the output information passing can surely be performed, thus leakage of the output information to third parties is avoided.

In the system according to still another aspect of this invention, an output request for desired information is issued to a computer through a mobile telephone. The computer adds an authentication number to the information, transmits the number to a target output device, and stores the authentication number and the information in a storage unit. When information is to be output from the output device, a user inputs an authentication number from the side of the output device. The authentication number is verified, and when there is a match between the authentication number and the stored authentication number, the information is output from the output device. Accordingly, leakage of the information to third parties is avoided.

Further, the storage unit is connected to the output device, so that the information transmitted from a computer is stored in the storage unit, and the information is output based on user authentication executed at the time of its output. Accordingly, leakage of the information to third parties is prevented.

Further, an input unit with which the authentication number is input is provided on the side of the output device. Accordingly, when information is to be output by the output device, an authentication number is input through the input unit without using a mobile telephone, which can ensure confidentiality of the information in a state of improved operability.

Further, the authentication number is set to a specific number. This specific number is determined by combining a progression obtained by referring to random numbers with a string of symbols by adding alphanumeric characters to the progression, or/and a telephone number of an originator, a product number, or a subscriber number and a password. These subscriber number and password are owned by a user who has subscribed to an information provider for accessing the computer. Accordingly, leakage of the number to third parties can be avoided. Especially, when the specific number owned by the mobile telephone is determined as an authentication number, overlaps between the authentication numbers and failing to remember the number can be avoided.

In the system according to still another aspect of this invention, a computer receives an output request for information and stores the information in a storage unit connected to a mobile telephone. The mobile telephone transmits the information stored in the storage unit to an output device at the time of its output, and an image is output by the output device. Accordingly, leakage of the information to third parties can be prevented without having to provide an authentication mechanism for user IDs or the like, which takes the load of the processing off the computer and the output device.

Further, communications between the mobile telephone and the output device are performed through a wireless network to eliminate a burdensome connection between terminals or the like, which can facilitate a connection between the mobile telephone and the output device.

Further, communications between the mobile telephone and the output device are performed by infrared transmission to eliminate a burdensome connection between terminals and the like, which can facilitate a connection between the mobile telephone and the output device.

Further, communications between the mobile telephone and the output device are performed through wireless communication based on Bluetooth standard to eliminate a burdensome connection between terminals or the like. Accordingly, a connection between the mobile telephone and the output device can reliably be facilitated.

Other objects and features of this invention will become apparent from the following description with reference to the accompanying drawings.

BRIEF DESCRIPTION OF THE DRAWINGS

FIG. 6 is a flow chart showing the operation in the remote output system according to the third embodiment.

DESCRIPTION OF THE PREFERRED EMBODIMENTS

Preferred embodiments of the remote output system of this invention are explained in detail below with reference to the attached drawings. The remote output system of this invention accesses a computer through a mobile telephone and outputs information stored in the computer. The first to the third embodiments as specific examples are explained below. It should be noted that the present invention is not limited by these embodiments.

In a first embodiment, a user issues an output request for desired information to a computer through a mobile telephone. The computer adds an authentication number to the information and transmits the number to an output device as a target output, stores the authentication number and the information in a general-purpose buffer storage unit, and verifies an authentication number transmitted from the mobile telephone. When there is a match between the authentication number and the stored authentication number, the information in the buffer storage unit is output from the output device.

Figure 1:
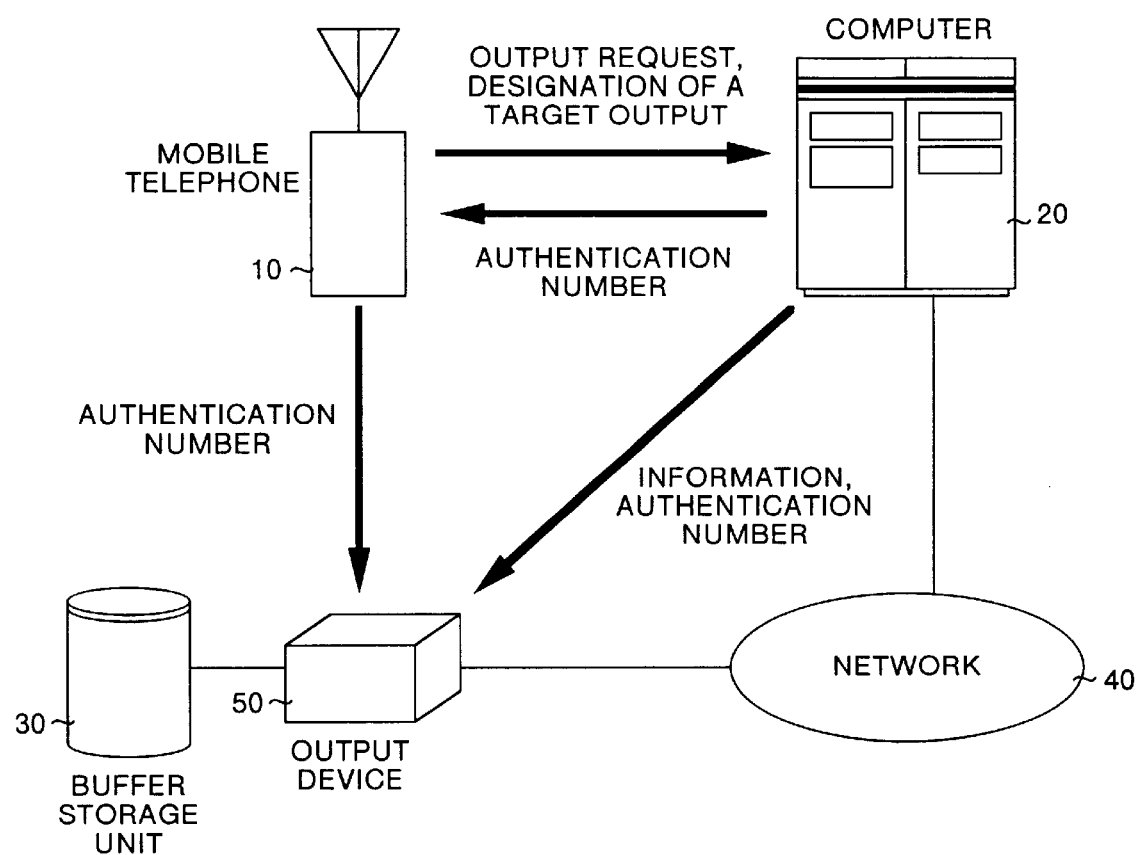
FIG. 1 is a block diagram showing the configuration of a remote output system according to a first embodiment of this invention.

The block diagram in FIG. 1 shows the configuration of the remote output system according to the first embodiment. Legend 10 represents a mobile telephone having a communicating function, and legend 20 represents a computer that provides information and is a generic name for a personal computer, a workstation, and a computer database. Legend 30 represents a buffer storage unit that stores information and authentication numbers sent from the computer 20. Legend 40 represents a network such as a LAN (Local Area Network), the Internet, or a telephone network. Legend 50 represents an image formation device such as a copier, a facsimile, and a printer. Alternatively, legend 50 also represents an output device using a writing unit for a media in which electronic information can be written. This media includes a floppy disk, MO (Magneto Optics), a CD-ROM (Compact Disc Read Only Memory), and a DVD (Digital Video Disc/Digital Versatile Disc), or the like.

The mobile telephone 10 is connected to the computer 20 and the output device 50. When using a wireless network, the mobile telephone 10 corresponds to a mobile telephone and a PHS, a mobile computer, or PDA. This mobile computer has a communicating function including a function of communicating by mounting a PHS on the mobile computer. As a communication means between the mobile telephone 10 and the output device 50 may be any means. For example, the technology such as infrared transmission defined in IRDA (InfraRed Data Association) and known wireless communication may be employed, and a dedicated connecting device may be provided as well.

Further, wireless communication based on Bluetooth as a wireless communication means may be performed between the mobile telephone 10 and the output device 50. That is, wireless data interchange is reliably performed through any mobile telephone 10 with a function of wireless communication following the Bluetooth standard by adding a Bluetooth function based on this standard to the output device 50.

The network 40 includes systems classified into a WAN (Wide Area Network) connected to the outside through a public network or a dedicated network and a LAN (Local Area Network) constructing a network within one premises. Either of the systems may be allowable. Alternatively, in the case of the network 40 having an Internet function, for example, TCP/IP (Transmission Control Protocol/Internet Protocol) may be used as communication protocol.

Figure 2:
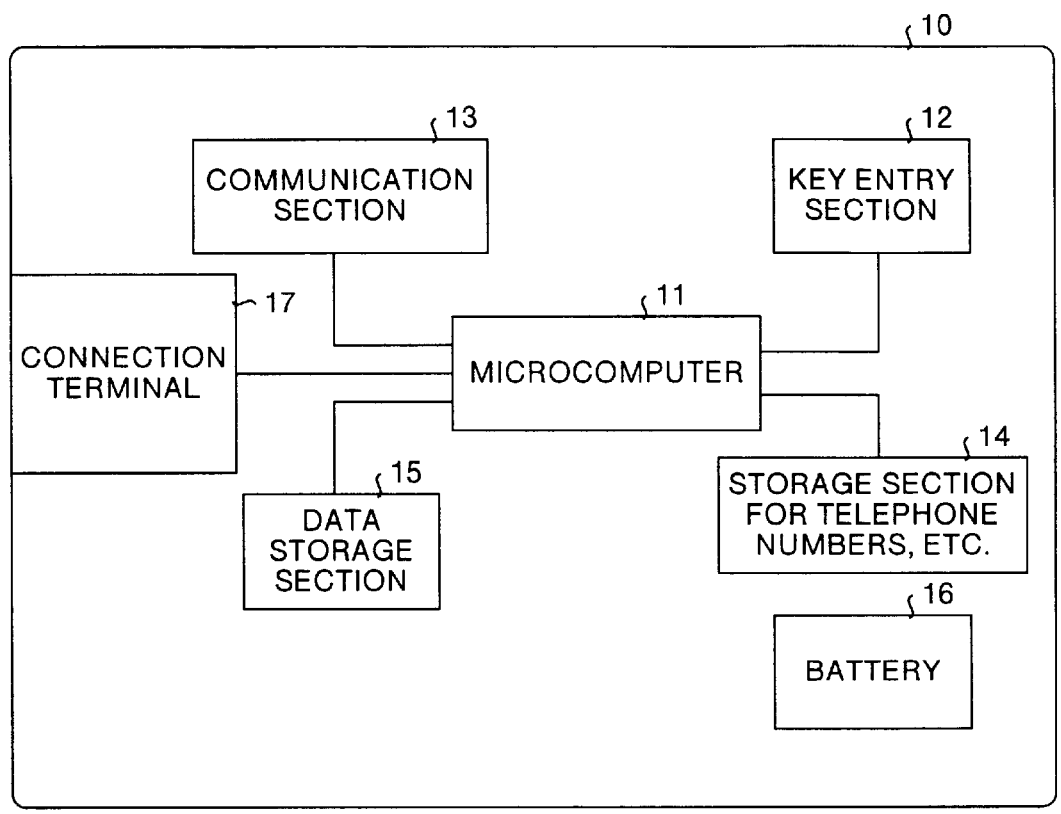
FIG. 2 is a block diagram showing the configuration of the mobile telephone shown in FIG. 1.

The block diagram in FIG. 2 shows the configuration of the mobile telephone 10. The mobile telephone 10 comprises a key entry section 12 consisting of ten-digit keypads and various entry keys for a microcomputer 11 that controls the whole. The mobile telephone 10 also comprises a communication section 13 that performs communications for retrieving information from a database in the computer 20 through a wireless network/a base station. The mobile telephone 10 further comprises a storage section 14 for telephone numbers, etc. that stores a number owned by the computer 20 and telephone numbers in the transmission side, a data storage section 15 that stores the information retrieved from the computer 20, and a connection terminal 17 used for a connection for communications. Legend 16 represents a battery that supplies the power to each section of the mobile telephone 10.

The mobile telephone 10 may employs either one of analog transmission and digital transmission in the case of wireless transmission. However, it is preferable to use the digital transmission such as TDMA: Time Division Multiple Access, or IMT-2000 as a next-generation mobile telecommunications system, in which communications over a wireless area are comparatively stable and high-speed communications are possible. GSM (Global System for Mobile Communications) may be used for the mobile telephone 10 in Europe or others, and an AMPS (Advanced Mobile Phone Service), IS-54, IS-136, or IS-95 may be used in USA or others.

That is, the mobile telephone 10 employs a PDC (Personal Digital Cellular) system, cdmaOne (Code Division Multiple Access), or the IMT-2000 system such as a next-generation type of system: Wideband-CDMA, cdma2000, or the like. Further, in place of the mobile telephone 10, a PHS (Personal Handy-phone System) may be used if travel is not so speedy and is within a comparatively narrow area. In the case of the PHS system, the known PHS system is provided for the internal configuration of the wireless network.

Figure 3:
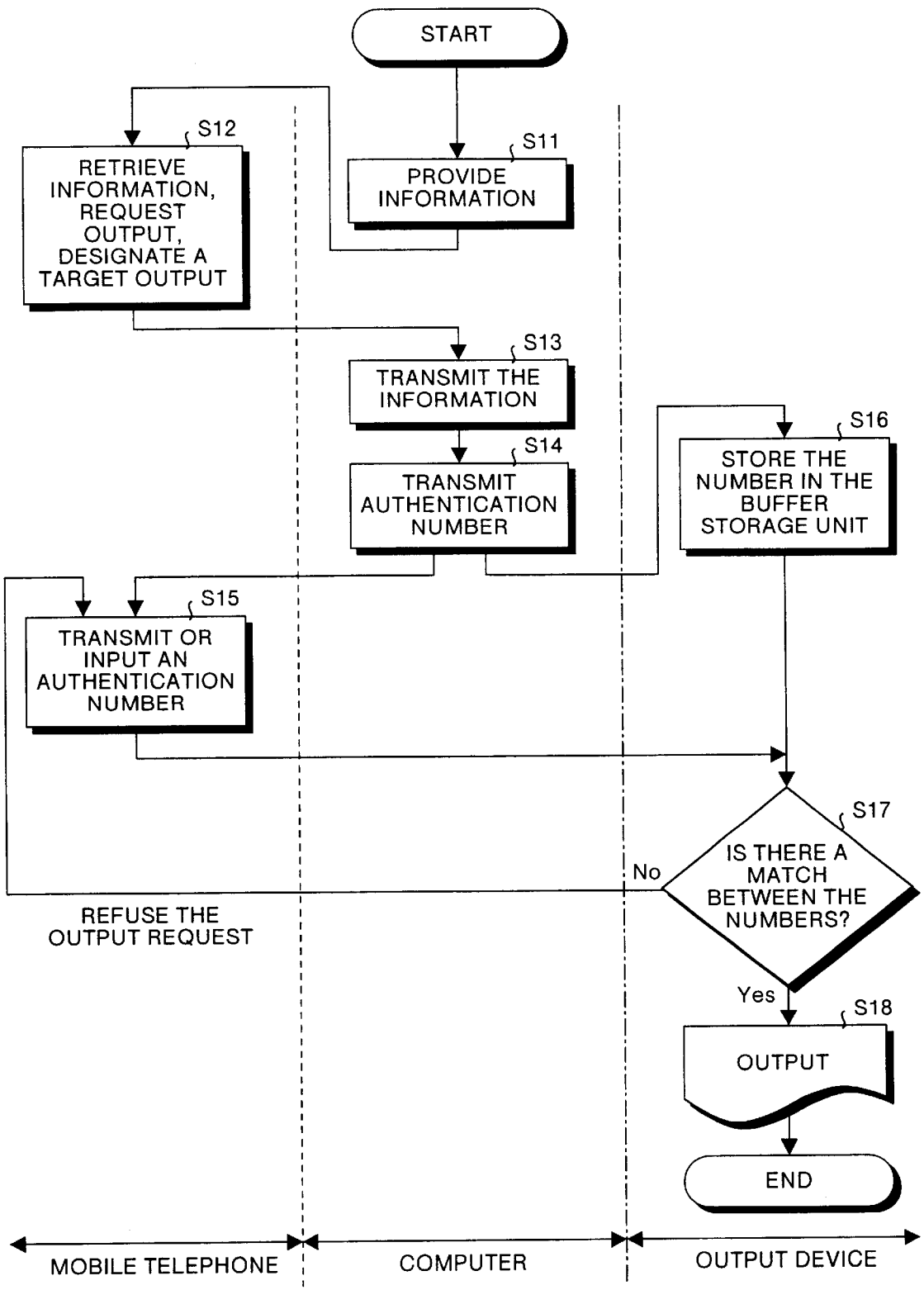
FIG. 3 is a flow chart showing the operation in the remote output system according to the first embodiment.

The remote output system operates as follows. The flow chart in FIG. 3 details the operation in the remote output system according to the first embodiment. The computer 20 provides information to the mobile telephone 10 (step S11). In the side of the mobile telephone 10, the information provided by the computer 20 is retrieved through the mobile telephone 10. An output request for desired information is issued to the computer 20, and a target output is designated (step S12). The computer 20 having received the output request adds an authentication number to the information whose output has been requested, and transmits the number to the output device 50 over the network 40 (steps S13, S14). The computer 20 also transmits the Authentication number to the mobile telephone 10 (step S15) The output device 50 stores the information and the authentication number received from the computer 20 in the built-in or detachable buffer storage unit 30 (step S16) The user of the mobile telephone 10 then moves to a place where the output device 50 is installed, and transmits the authentication number notified from the computer 20 to the output device 50 through the mobile telephone 10. The output device 50 verifies the transmitted authentication number (step S17), and outputs the relevant information stored in the buffer storage unit 30 when there is a match between the authentication number and the stored authentication number (step S18).

The authentication number used in this system may be any number. For example, a string of symbols obtained by combining random numbers with a series of serial numbers, or numerals and characters maybe used. Further, any number obtained by combining this string with information owned by the mobile telephone 10 such as a telephone number of an originator and a product number (serial No.) may be used. When the user has subscribed to an information provider such as i mode of NTT DoCoMo or WAP (Wireless Application Protocol) used for accessing the computer, a subscriber number and a password (user ID) may also be used by being combined with the above string or number.

Therefore, the user of the mobile telephone 10 can issue an output request for the information at any place apart from the output device 50 based on the remote output system. Accordingly, the user can make effective use of the convenience of the mobile telephone 10. Further, desired information can be output without existence of a third party between the user and the output device 50, thus confidentiality of the information can be ensured.

That is, in the remote output system, retrieval of information and a request of its output are executed through the mobile telephone 10. Therefore, there is no need to prepare a dedicated device for retrieval of information. When the dedicated device, through which information is retrieved and an output request for the information is issued, is installed, only one person can operate the device at a time. However, in this system, using the mobile telephone 10 can simultaneously carry out a plurality of output requests. Further, when the user has a common authentication number between the mobile telephone 10 and information is to be output from the output device 50, the authentication number is input through the mobile telephone 10. The authentication number is verified, and when there is a match between the authentication number and the stored authentication number, the information is output. Accordingly, leakage of the information to third parties can be prevented. Further, the output device 50 performs verification based on the authentication numbers, which can decentralize the load on the verification from the computer 20 to the output device 50.

In the first embodiment, an output request for desired information is issued to the computer 20 through the mobile telephone 10. The computer 20 adds an authentication number to the information and transmits the number to the output device 50 as a target output, stores the authentication number and the information in the buffer storage unit 30, and verifies an authentication number transmitted from the mobile telephone 10. When there is a match between the authentication number and the stored authentication number, the information is output from the output device 50. On the other hand, in the second embodiment explained below, the operation from an output request for information till storage of the authentication number and the information in the buffer storage unit 30 is the same as that of the first embodiment. However, there is a difference in that the user inputs the authentication number from the side of the output device 50 when information is output from the output device 50.

Figure 4:
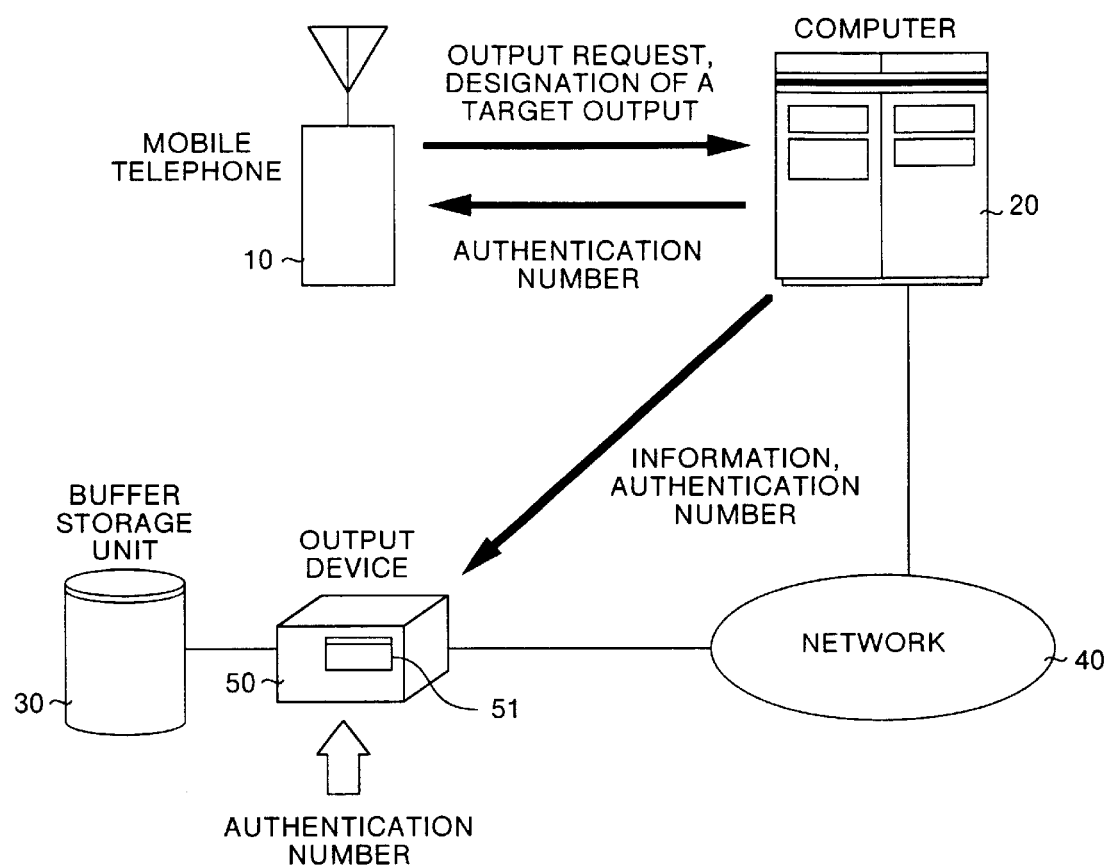
FIG. 4 is a block diagram showing the configuration of a remote output system according to a second embodiment of this invention.

The block diagram in FIG. 4 shows the configuration of the remote output system according to the second embodiment. In this system, an authentication number can be input from an operation input section 51 of the output device 50 when outputting information as compared to the configuration of FIG. 1 explained in the first embodiment. An input device such as a keyboard, a key panel, or a liquid-crystal touch panel is used for the operation input section 51. The rest of the components and their functions are the same as those in the first embodiment. Therefore, the same legends are assigned to the components corresponding to those in FIG. 1, and explanation of the components is omitted.

The remote output system operates as follows. Like in the first embodiment, information provided from the computer 20 is retrieved through the mobile telephone 10, and an output request for desired information is issued to the computer 20 and a target output is designated. The computer 20 having received the output request adds an authentication number to the information whose output has been requested, and transmits the number to the output device 50 over the network 40. At the same time, the computer 20 transmits the authentication number to the mobile telephone 10. The output device 50 stores the information and the authentication number received from the computer 20 in the built-in or detachable buffer storage unit 30.

The user of the mobile telephone 10 then moves to a place where the output device 50 is installed. The user inputs an authentication number notified from the computer 20 through the operation input section 51 of the output device 50. The output device 50 verifies the authentication number, and outputs the relevant information stored in the buffer storage unit 30.

Accordingly, in this remote output system, the retrieval of information and the output request for the information are executed through the mobile telephone 10. Therefore, there is no need to prepare a dedicated device for retrieval of information. When the dedicated device, through which information is retrieved and output of the information is requested, is installed, only one person can operate the device at a time. However, in this system, using the mobile telephone 10 can simultaneously carry out a plurality of output requests. Further, when the user has a common authentication number between the mobile telephone 10 and the output device 50 and information is to be output from the output device 50, the authentication number is input through the operation input section 51 of the output device 50. The authentication number is then verified, and when there is a match between the authentication number and the stored authentication number, the information is output. Accordingly, leakage of the information to third parties can be prevented. Further, the output device 50 performs verification based on the authentication numbers, which can decentralize the load on the verification from the computer 20 to the output device 50.

In the first and second embodiments, an output request for desired information is issued to the computer 20 through the mobile telephone 10. The computer 20 adds an authentication number to the information and transmits the number to the output device 50 as a target output, stores the authentication number and the information in the buffer storage unit 30, and verifies an authentication number input through the mobile telephone 10 or the operation input section 51 of the output device 50. When there is a match between the authentication number and the stored authentication number, the information is output from the output device 50. On the other hand, in the third embodiment explained below, an output request for information is received and the information is stored in the buffer storage unit 30 connected to the mobile telephone 10. When the information is to be output, the information in the buffer storage unit 30 is transmitted to the output device 50, and an image is output from the output device 50.

Figure 5:
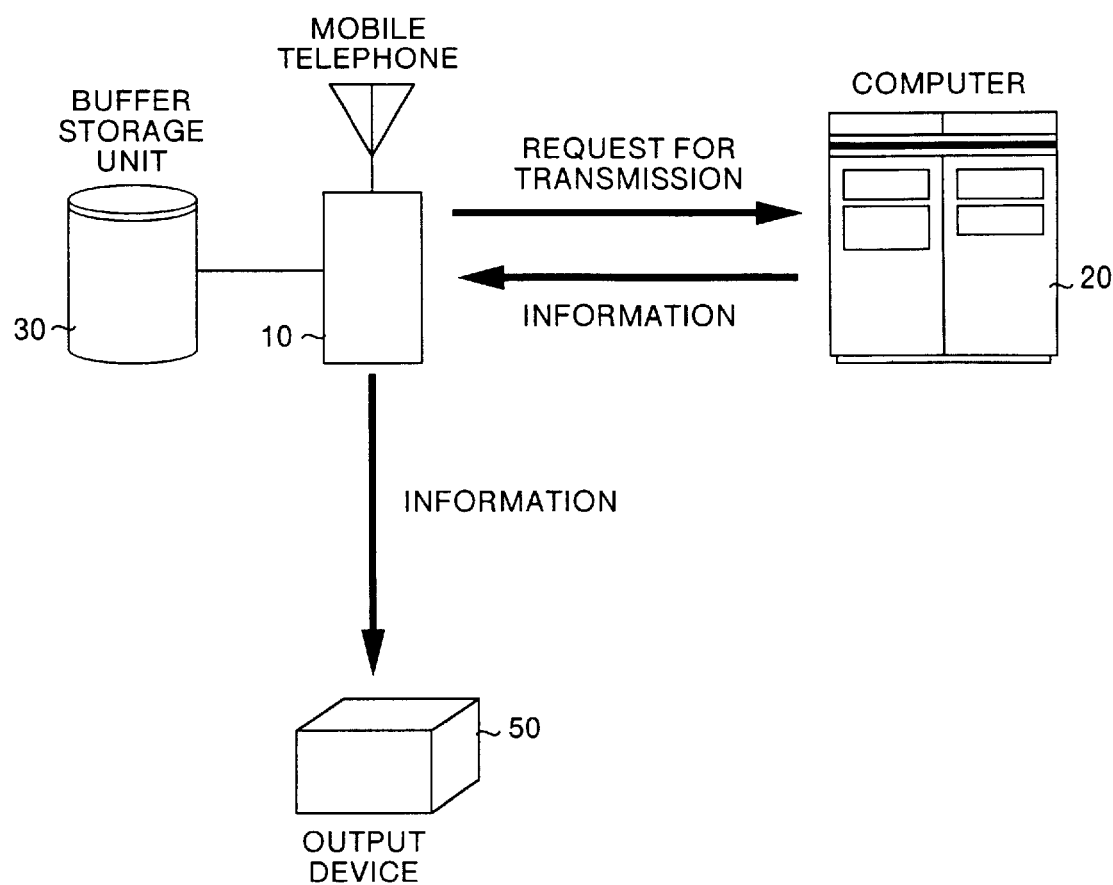
FIG. 5 is a block diagram showing the configuration of a remote output system according to a third embodiment of this invention.

The block diagram in FIG. 5 shows the configuration of the remote output system according to the third embodiment. This system is configured to detachably provide the buffer storage unit 30, which stores information transmitted from the computer 20, in the mobile telephone 10. The rest of the components and their functions are the same as those in the first embodiment. Therefore, the same legends are assigned to the components corresponding to those in FIG. 1, and explanation of the components is omitted.

The remote output system operates as follows. The flow chart in FIG. 6 details the operation in the remote output system according to the third embodiment. The computer 20 provides information to the mobile telephone 10 (step S21). In the side of the mobile telephone 10, the information provided by the computer 20 is retrieved through the mobile telephone 10, an output request for desired information is issued to the computer 20, and a target output is also designated (step S22). The computer 20 having received the output request transmits the information whose output has been requested to the mobile telephone 10 (step S23), and the mobile telephone 20 stores the transmitted information in the buffer storage unit 30 (step S24) Further, the mobile telephone 10 transmits the information from the buffer storage unit 30 to the output device 50 (step S25), and the information is output from the output device 50 (step S26).

Accordingly, in this remote output system, retrieval of information and an output request for the information are executed through the mobile telephone 10. Therefore, there is no need to prepare a dedicated device for retrieval of information. When the dedicated device, through which information is retrieved and output of the information is requested, is installed, only one person can operate the device at a time. However, in this system, using the mobile telephone 10 can simultaneously carry out a plurality of output requests. Particularly, in this third embodiment, the information from the computer 20 is stored in the buffer storage unit 30 connected to the mobile telephone 10. Therefore, leakage of the secret information to third parties can be prevented. Further, there is no need to provide an authentication mechanism, which takes the load of the processing off the computer 20 and the output device 50.

The system according to one aspect of this invention retrieves information provided by the computer and issues an output request for the information through the mobile telephone, and outputs an image of the information from the output device. Accordingly, the need for preparing the dedicated terminal for retrieval can be eliminated, thus more easily retrieving information provided by the computer and outputting the information.

In the system according to another aspect of this invention, when information provided by the computer is to be output, an output request for desired information is issued to the computer through the mobile telephone. The computer adds an authentication number to the information, transmits the number to the target output device, stores the authentication number and the information in the storage unit, and verifies an authentication number transmitted from the mobile telephone for user authentication. Only when there is a match between the authentication number and the stored authentication number, the information is output from the output device. Accordingly, leakage of the information to third parties can be avoided, thus ensuring confidentiality of the information.

In the system according to still another aspect of this invention, an output request for desired information is issued to the computer through the mobile telephone. The computer adds an authentication number to the information, transmits the number to the target output device, and stores the authentication number and the information in the storage unit. When the information is to be output from the output device, a user inputs an authentication number from the side of the output device. The authentication number is verified, and when there is a match between the authentication number and the stored authentication number, the information is output from the output device. Accordingly, leakage of the information to third parties can be avoided, thus ensuring confidentiality of the information.

Further, the storage unit is connected to the output device, so that the information transmitted from the computer is stored in the storage unit, and the information is output based on user authentication executed at the time of its output. Accordingly, leakage of the information to third parties can be prevented, thus ensuring confidentiality of the information.

Further, the input unit with which the authentication number is input is provided on the side of the output device. Therefore, when information is to be output by the output device, an authentication number is input through the input unit without using the mobile telephone. Accordingly, leakage of the information to third parties can be prevented in a state of improved operability, thus ensuring confidentiality of the information.

Further, the authentication number is set to a specific number. This specific number is determined by combining a progression obtained by referring to random numbers with a string of symbols by adding alphanumeric characters to the progression, or/and a telephone number of an originator, a product number, or a subscriber number and a password. These subscriber number and password are owned by a user who has subscribed to an information provider for accessing the computer. Accordingly, leakage of the number to third parties, which may occur at the time of acquiring the output information, can be avoided. Especially, when the specific number owned by the mobile telephone is determined as an authentication number, the user can use any number related to the mobile telephone owned by the user. Therefore, overlaps between the authentication numbers and failing to remember the number can be avoided.

In the system according to still another aspect of this invention, the computer receives an output request for information and stores the information in the storage unit connected to the mobile telephone. The mobile telephone transmits the information in the storage unit to the output device at the time of its output, and an image is output by the output device. Accordingly, leakage of the information to third parties can be prevented, and no authentication mechanism is provided, which takes the load of the processing off the computer and the output device.

Further, communications between the mobile telephone and the output device are performed through a wireless network to eliminate burdensome operation (work) such as connection between connectors or the like. Accordingly, a connection between the mobile telephone excellent in convenience of use and the output device can be realized.

Further, communications between the mobile telephone and the output device are performed by infrared transmission to eliminate burdensome operation (work) such as connection between connectors or the like. Accordingly, a connection between the mobile telephone excellent in convenience of use and the output device can be realized.

Further, communications between the mobile telephone and the output device are performed by Bluetooth to eliminate a burdensome connection between the terminals or the like. Accordingly, a connection between the mobile telephone and the output device can reliably be facilitated.

The present document incorporates by reference the entire contents of Japanese priority document, 2000-029646 filed in Japan on Feb. 7, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A remote output system comprising:
   at least one mobile telephone having a communication unit, a user of said mobile telephone being capable of retrieving information using said mobile telephone;
   a computer which provides the information to said mobile telephone and appends an authentication number to detailed information corresponding to the retrieved information and transmits the authentication number appended information; and
   an output unit which receives information transmitted from said mobile telephone or said computer, verifies whether an authentication number input through and supplied from said mobile telephone and the authentication number appended to the detailed information match, and outputs the information.

2. The remote output system according to claim 1, wherein said mobile telephone executes data transmission and reception with said output unit through a wireless network.

3. The remote output system according to claim 1, wherein said mobile telephone executes data transmission and reception with said output unit by infrared transmission.

4. The remote output system according to claim 1, wherein said mobile telephone executes data transmission and reception with said output unit through wireless communication based on Bluetooth standard.

5. A remote output system comprising:
   at least one mobile telephone having a communication unit, a user of said mobile telephone being capable of retrieving an item of information, issuing a request to output the retrieved item, and designating a target device that should output the retrieved item, using said mobile telephone;
   a computer which appends an authentication number to detailed information corresponding to the retrieved item and transmits the authentication number appended information;
   a storage unit which stores the authentication number appended information transmitted by said computer; and
   an output unit which verifies whether an authentication number input through and supplied from said mobile telephone and the authentication number appended to the information stored in said storage unit match with each other, and outputs the information stored in said storage unit only when the two authentication numbers are identical.

6. The remote output system according to claim 5, wherein said storage unit is connected to said output unit.

7. The remote output system according to claim 5, wherein said mobile telephone executes data transmission and reception with said output unit through a wireless network.

8. The remote output system according to claim 5, wherein said mobile telephone executes data transmission and reception with said output unit by infrared transmission.

9. The remote output system according to claim 5, wherein said mobile telephone executes data transmission and reception with said output unit through wireless communication based on Bluetooth standard.

10. A remote output system comprising:
    at least one mobile telephone having a communication unit, a user of said mobile telephone being capable of retrieving an item of information, issuing a request to output the retrieved item, and designating a target device that should output the retrieved item, using said mobile telephone;
    a computer which appends an authentication number to detailed information corresponding to the retrieved item and transmits the authentication number appended information;
    a storage unit which stores the authentication number appended information transmitted by said computer; and
    an output unit which verifies whether an authentication number input by a user when outputting the information and the authentication number appended to the information stored in said storage unit match with each other, and outputs the information stored in said storage unit only when the two authentication numbers are identical.

11. The remote output system according to claim 10, wherein said storage unit is connected to said output unit.

12. The remote output system according to claim 10, wherein said storage unit has an input unit with which a user inputs the authentication number.

13. The remote output system according to claim 10, wherein the authentication number is a string of symbols including random numbers or/and a specific number assigned to said mobile telephone.

14. The remote output system according to claim 10, wherein said mobile telephone executes data transmission and reception with said output unit through a wireless network.

15. The remote output system according to claim 10, wherein said mobile telephone executes data transmission and reception with said output unit by infrared transmission.

16. The remote output system according to claim 10, wherein said mobile telephone executes data transmission and reception with said output unit through wireless communication based on Bluetooth standard.

17. A remote output system comprising:
a mobile telephone with which a user retrieves an item of information through a communication means, and issues an output request for the item;
a computer which transmits and appends an authentication number to detailed information corresponding to the information retrieved by said mobile telephone to said mobile telephone;
a storage unit which is connected to said mobile telephone and stores the detailed information transmitted from said computer; and
an output unit which verifies whether an authentication number input through and supplied from said mobile telephone and the authentication number appended to the detailed information match, and outputs the detailed information stored in said storage unit through said mobile telephone.

18. The remote output system according to claim 17, wherein said mobile telephone executes data transmission and reception with said output unit through a wireless network.

19. The remote output system according to claim 17, wherein said mobile telephone executes data transmission and reception with said output unit by infrared transmission.

20. The remote output system according to claim 17, wherein said mobile telephone executes data transmission and reception with said output unit through wireless communication based on Bluetooth standard.

21. The remote output system according to claim 1, wherein said output unit is a printer.

22. The remote output system according to claim 5, wherein said output unit is a printer.

23. The remote output system according to claim 10, wherein said output unit is a printer.

24. The remote output system according to claim 17, wherein said output unit is a printer.

25. A remote output system comprising:
at least one mobile communication means, a user of said mobile communication means cable of retrieving desired information by inputting certain parameter through said mobile communication means;
information providing means for obtaining the parameters from said mobile communication means, retrieving information based on the parameters, appending an authentication number to detailed information corresponding to the retrieved information, and transmitting the authentication number appended information; and
output means for receiving the information transmitted from said mobile communication means or said information providing means, verifying whether an authentication number input through and supplied from said mobile telephone and the authentication number appended to the detailed information match, and outputting the information.

26. A remote output system comprising:
at least one mobile communication means, a user of said mobile communication means being capable of retrieving desired information, issuing a request to output the retrieved information, and designating a target device that should output the retrieved information by inputting certain parameter through said mobile communication means;
information providing means for obtaining the parameters from said mobile communication means and retrieving information based on the parameters, appending an authentication number to the retrieved information, and transmitting the authentication number appended information;
storing means for storing the authentication number appended information transmitted by said information providing means; and
output means for verifying whether an authentication number input through and supplied from said mobile communication means and the authentication number appended to the information stored in said storing means match with each other, and outputting the information stored in said storing means only when the two authentication numbers are identical.

27. A remote output system comprising:
at least one mobile communication means, a user of said mobile communication means being capable of retrieving desired information, issuing a request to output the retrieved information, and designating a target device that should output the retrieved information by inputting certain parameter through said mobile communication means;
information providing means for obtaining the parameters from said mobile communication means and retrieving information based on the parameters, appending an authentication number to the retrieved information, and transmitting the authentication number appended information;
storing means for storing the authentication number appended information transmitted by said information providing means; and
output means for verifying whether an authentication number input by a user when outputting the information and the authentication number appended to the information stored in said storing means match with each other, and outputting the information stored in said storing means only when the two authentication numbers are identical.

28. A remote output system comprising:
at least one mobile communication means, a user of said mobile communication means being capable of retrieving desired information, and issuing a request to output the retrieved information by inputting certain parameter through said mobile communication means;
information providing means for obtaining the parameters from said mobile communication means, and for appending an authentication number to detailed information corresponding to the retrieved information and transmitting the authentication number appended information;

retrieving information based on the parameters, and providing the retrieved information to said mobile communication means;

storing means connected to said mobile communication means for storing the information transmitted from said information providing means; and output means for verifying whether an authentication number input through and supplied from said mobile telephone and the authentication number appended to the detailed information match, and for outputting the information stored in said storing means.

29. The remote output system according to claim 17, wherein said storage unit has an input unit with which a user inputs the authentication number.

30. The remote output system according to claim 26, wherein said storage unit has an input unit with which a user inputs the authentication number.

31. The remote output system according to claim 27, wherein said storage unit has an input unit with which a user inputs the authentication number.

* * * * *